United States Patent
Finter et al.

(10) Patent No.: US 9,475,904 B2
(45) Date of Patent: Oct. 25, 2016

(54) HEAT CURABLE EPOXY RESIN COMPOSITION WITH WATER AS FOAMING AGENT

(75) Inventors: Jürgen Finter, Zurich (CH); Elyes Jendoubi, Zurich (CH)

(73) Assignee: SIKA TECHNOLOGY AG, Baar (CH)

( * ) Notice: Subject to any disclaimer, the term of this patent is extended or adjusted under 35 U.S.C. 154(b) by 359 days.

(21) Appl. No.: 13/224,691

(22) Filed: Sep. 2, 2011

(65) Prior Publication Data

US 2012/0055631 A1 Mar. 8, 2012

(30) Foreign Application Priority Data

Sep. 3, 2010 (EP) .................................... 10175189

(51) Int. Cl.
| | | |
|---|---|---|
| C09J 163/00 | (2006.01) | |
| C08G 59/40 | (2006.01) | |
| C08G 59/42 | (2006.01) | |
| C08G 59/44 | (2006.01) | |
| C08G 59/46 | (2006.01) | |
| C08G 59/48 | (2006.01) | |
| C08J 9/02 | (2006.01) | |

(52) U.S. Cl.
CPC ............ C08G 59/4021 (2013.01); C08G 59/42 (2013.01); C08G 59/4246 (2013.01); C08G 59/44 (2013.01); C08G 59/46 (2013.01); C08G 59/48 (2013.01); C08J 9/02 (2013.01); C08J 2363/00 (2013.01)

(58) Field of Classification Search
CPC .............. C08G 59/4021; C08G 59/42; C08G 59/4246; C08G 59/44; C08G 59/48
USPC .................... 156/330; 521/118, 135
See application file for complete search history.

(56) References Cited

U.S. PATENT DOCUMENTS

| | | |
|---|---|---|
| 3,655,818 A | 4/1972 | McKown |
| 4,889,890 A | 12/1989 | Kerr et al. |
| 4,897,460 A | 1/1990 | Sakamoto et al. |
| 5,013,791 A | 5/1991 | Kerr et al. |
| 6,387,470 B1 | 5/2002 | Chang et al. |
| 2010/0108258 A1 | 5/2010 | Finter et al. |
| 2010/0273005 A1* | 10/2010 | Kramer et al. ............... 428/414 |

FOREIGN PATENT DOCUMENTS

| | | | |
|---|---|---|---|
| CN | 1756817 A | 4/2006 | |
| CN | 101724225 A | 6/2010 | |
| EP | 0 276 526 A1 | 8/1988 | |
| EP | 0 469 550 A2 | 2/1992 | |
| EP | 2 182 025 A1 | 5/2010 | |
| WO | WO 2004/055092 A1 | 7/2004 | |
| WO | WO 2004/083325 A1 | 9/2004 | |
| WO | WO 2004/106402 A2 | 12/2004 | |
| WO | WO 2007/004184 A1 | 1/2007 | |
| WO | WO 2009/063043 * | 5/2009 | ............ C08G 18/10 |

OTHER PUBLICATIONS

An Office Action issued Oct. 10, 2014, in corresponding Chinese Patent Application No. 201110263340.X, with an English translation thereof.
European Search Report issued on Mar. 18, 2011, by European Patent Office for Application No. 10175189.9 (with English language translation of category of documents).
European Search Report issued on Mar. 18, 2011, by European Patent Office for Application No. 10175189.9 (with English language translation of category of cited documents).
Written Opinion issued by European Patent Office for Application No. 10175189.9, Mar. 18, 2011.

* cited by examiner

*Primary Examiner* — Joseph S. Del Sole
*Assistant Examiner* — John Robitaille
(74) *Attorney, Agent, or Firm* — Buchanan Ingersoll & Rooney PC

(57) ABSTRACT

Heat-curable epoxy resin compositions and the use thereof, for example, in motor vehicle construction and sandwich panel construction, are disclosed. Exemplary heat-curable epoxy resin compositions include, in addition to epoxy resin components A1, optionally A2, a hardener component B, a carboxylic acid C and a hydroxyalkylamide or hydroxyalkylurea H, an accelerator E for activation of the conversion of components A1, A2 and B. The compositions and the structural foams produced therefrom are notable for high mechanical strength, high glass strength and good adhesion capacity on metallic and nonmetallic substrates, and it is possible at the same time to dispense with the use of toxic or inflammable blowing agents.

20 Claims, No Drawings

HEAT CURABLE EPOXY RESIN COMPOSITION WITH WATER AS FOAMING AGENT

RELATED APPLICATION(S)

This application claims priority to European Application No. 10175189.9 filed in Europe on Sep. 3, 2010, the entire contents of which are hereby incorporated by reference.

FIELD

The disclosure relates to the field of heat-curable epoxy resin compositions and to the use thereof, for example, in motor vehicle construction and sandwich panel construction.

BACKGROUND

Heat-curable epoxy resin compositions have long been used as adhesives in bodyshell construction and in reinforcing elements or structural foams.

An important field of use of heat-curable epoxy resin compositions is thus in motor vehicle construction, and more particularly in the adhesive bonding or foam filling of cavities in bodyshell construction. In both cases, after the epoxy resin composition has been applied, the body is heated in a cathodic electrocoating furnace, which also cures and, if appropriate, foams the heat-curable epoxy resin composition.

Reinforcing elements comprising a heat-curable epoxy resin composition which forms a structural foam under the reaction of heat are known, for example, by the SikaReinforcer® trade name. U.S. Pat. No. 6,387,470 B1 discloses, for example, a heat-curable and foamable sealing compound which comprises a mixture of liquid epoxy resin and solid epoxy resin in the presence of 5-20% by weight of a thermoplastic such as polystyrene and 30-45% by weight of a thermoplastic elastomer such as SBS block copolymer. The mechanical properties, for example, the glass transition temperature, and adhesion properties of such compositions are, however, greatly worsened due to the high proportion of SBS block copolymer.

In order that rapid curing is possible, not only heat-activatable hardeners for epoxy resins but typically also accelerators are used. A significant category of accelerators is that of ureas. Heat-curable epoxy resin compositions which may comprise ureas as accelerators are known, for example, from International Publication Nos. WO2004/106402 A2 and WO2004/055092 A1.

Epoxy resin compositions are usually foamed by means of chemical blowing agents, generally organic azo compounds, which decompose when heated, or by means of expandable hollow polymer spheres filled with a low-boiling organic compound. The former afford primarily nitrogen through the decomposition reaction, forming toxic ammonia as a by-product according to the conditions. Expandable hollow polymer spheres again are filled with inflammable hydrocarbons, and therefore storage and transport are subject to particular regulations. Such chemical blowing agents are known by the Expancel® trade name from Akzo Nobel or Celogen® trade name from Chemtura or Luvopor® trade name from Lehmann & Voss, Germany.

The literature additionally also describes carbon dioxide, which is generated in a polymer matrix by reaction of chalk ($CaCO_3$) with phosphoric acid. However, such a process is possible only with two-component epoxy resin compositions and in that respect is not an option for (one-component) heat-curable epoxy resin compositions.

SUMMARY

Disclosed are exemplary heat-curable epoxy resin compositions which firstly can have good storage stability at room temperature and good mechanical, thermal and adhesion properties, and secondly can provide a nontoxic blowing agent which is not subject to any transport and storage regulations for production of structural foams.

An exemplary epoxy resin composition can be used particularly efficiently as a one-component heat-curable adhesive which is solid at room temperature, for example, as a heat-curable one-component bodyshell adhesive in motor vehicle construction, and for production of a structural foam for the reinforcement of cavities, for example, of metallic structures.

Surprisingly, it has additionally been found that an exemplary heat-curable epoxy resin composition under the customary temperature conditions used for heat curing can lead to the formation of a foam with high mechanical strength, high glass strength and good adhesion capacity on metallic and nonmetallic substrates, and it is possible at the same time to completely dispense with the use of the known toxic or inflammable blowing agents.

According to an exemplary aspect, a heat-curable epoxy resin composition is disclosed, comprising:

at least one solid epoxy resin A1 having an average of more than one epoxide group per molecule;

optionally at least one liquid epoxy resin A2 with an average of more than one epoxide group per molecule;

at least one hardener B for epoxy resins which is activated by elevated temperature;

at least one carboxylic acid C;

at least one hydroxyalkylamide or hydroxyalkylurea H; and at least one accelerator E based on a urea derivative for activation of the conversion of components A1, and optionally A2, with B.

According to an exemplary embodiment, a reinforcing element for the reinforcement of metallic structures is disclosed, comprising a support to which a heat-curable epoxy resin composition has been applied.

According to an exemplary embodiment, a process for bonding heat-stable substrates is disclosed, comprising:

i) applying a heat-curable epoxy resin composition according to claim 1 to a surface of a heat-stable substrate S1;

ii) contacting the applied heat-curable epoxy resin composition with a surface of a further heat-stable substrate S2;

iii) heating the heat-curable epoxy resin composition to a temperature of 100-220° C;

wherein said substrate S2 is of a same or different material as the substrate S1.

According to an exemplary embodiment, a structural foam obtained by heating a heat-curable epoxy resin composition is disclosed.

DETAILED DESCRIPTION

An exemplary heat-curable epoxy resin composition is disclosed which comprises at least one solid epoxy resin A1 having an average of more than one epoxide group per molecule;

optionally at least one liquid epoxy resin A2 with an average of more than one epoxide group per molecule;

at least one hardener B for epoxy resins which is activated by elevated temperature;

at least one carboxylic acid C;

at least one hydroxyalkylamide or hydroxyalkylurea H; and

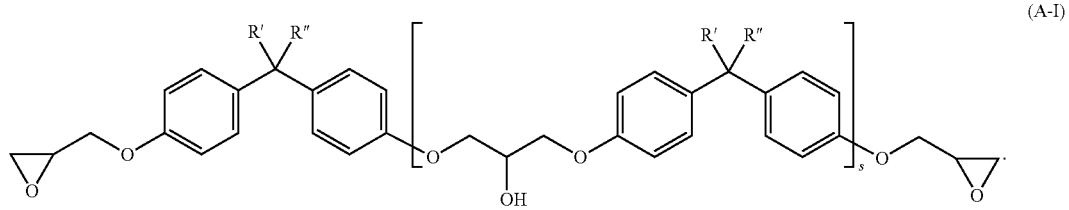

at least one accelerator E based on a urea derivative for activation of the conversion of components A1, and optionally A2, with B.

The exemplary epoxy resin composition comprises the constituents A1, B and optionally A2, which lead to the formation of an epoxy resin matrix via a crosslinking reaction when the temperature is increased. The exemplary epoxy resin composition further comprises a carboxylic acid C and a hydroxyalkylamide or hydroxyalkylurea H which, when the temperature is increased, react with one another and, through a condensation reaction, provide water, which is suitable as a blowing agent under the given temperature conditions (vaporous form).

However, the reaction of these constituents alone does not lead to the formation of a structural foam with the desired properties. At the temperatures typically used (100° C.-220° C.), the viscosity of the epoxy resin matrix is only low, as a result of which the steam produced by the condensation reaction diffuses out to a relevant extent and is thus no longer available as a blowing agent. This would adversely affect foam formation and quality and ultimately nullify the concept of use of water as a blowing agent.

Exemplary aspects ameliorate or overcome this problem. Addition of an accelerator E based on a urea derivative activates the conversion of components A1, A2 and B, such that the reaction to form the epoxy resin matrix is accelerated. Addition of the accelerator E results in the lowering of the onset temperature of the conversion reaction and an associated increase in viscosity of the epoxy resin matrix, which in turn makes more difficult or even prevents the water formed by condensation reaction from diffusing out.

The heat-curable epoxy resin composition comprises epoxy resins with an average of more than one epoxide group per molecule. The epoxide group is can be present as a glycidyl ether group. These epoxy resins are a mixture of at least one solid epoxy resin A1 and optionally at least one liquid epoxy resin A2, each with an average of more than one epoxide group per molecule.

The glass transition temperature of solid resins is above room temperature, for example, they can be comminuted at room temperature to give pourable particles.

Exemplary solid epoxy resins have the formula (A-I)

In this formula, the substituents R' and R" are each independently either H or $CH_3$.

In addition, the index s is a value of >1.5, for example, 2 to 12.

Such solid epoxy resins are commercially available, for example from Dow or Huntsman or Hexion.

Compounds of the formula (A-I) with an index s from 1 to 1.5 are referred to by the person skilled in the art as semisolid epoxy resins. In an exemplary embodiment, they can be considered to be solid resins. Epoxy resins can be used where the index s has a value of >1.5.

Exemplary liquid epoxy resins A2 have the formula (A-II)

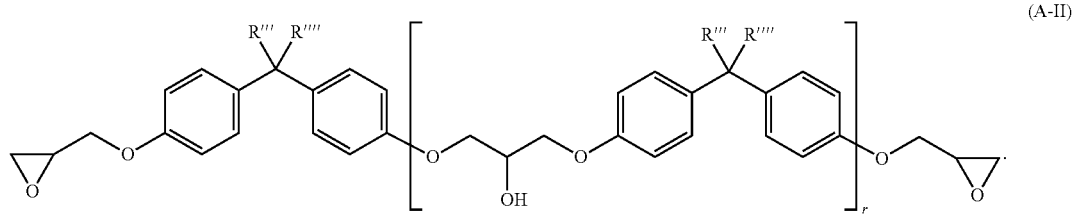

In this formula, the substituents R''' and R'''' are each independently either H or $CH_3$. In addition, the index r is a value of 0 to 1. r can be a value of less than 0.2.

The substance can comprise diglycidyl ethers of bisphenol A (DGEBA), of bisphenol F and of bisphenol A/F (the designation 'A/F' refers here to a mixture of acetone with formaldehyde which is used as the reactant in the preparation thereof). Such liquid resins are available, for example, under the trade names Araldite® GY 250, Araldite® PY 304, Araldite® GY 282 (Huntsman) or D.E.R.™ 331 or D.E.R.™ 330 (Dow) or Epikote 828 (Hexion).

Additionally suitable are what are called novolacs. These can have the following formula:

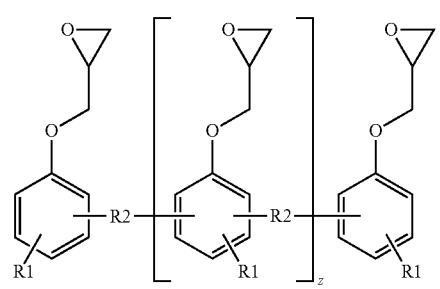

where

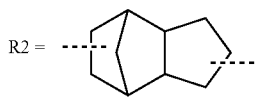

or $CH_2$, R1=H or methyl and z=0 to 7.

These can be phenol novolacs or cresol novolacs ($R^2=CH_2$).

Such epoxy resins are commercially available under the EPN or ECN and Tactix®556 trade names from Huntsman, or under the D.E.N.™ product series from Dow Chemical.

According to an exemplary aspect, the heat-curable epoxy resin composition comprises at least one solid epoxy resin A1, and also optionally at least one liquid epoxy resin A2.

The proportion of the epoxy resin mixture A1 and A2 here can be 10-85% by weight, for example, 15-70% by weight, for example, 15-60% by weight, of the total weight of the exemplary epoxy resin composition.

In an exemplary embodiment, the hardener B is a latent hardener selected from the group consisting of dicyandiamide, guanimine, guanidine, aminoguanidine and derivatives thereof, and aromatic or aliphatic carboxylic hydrazides. "Latent hardeners" can refer to systems which are unreactive at low temperatures, for example room temperature; at higher temperatures, they react with the epoxy resin constituent to give the polymer.

The latent hardener B is activatable, for example, at a temperature of 100-220° C., for example, 120-200° C., for example, between 160 and 190° C.

An exemplary hardener B is dicyandiamide.

For example, the total proportion of the hardener B is 1-10% by weight, for example, 2-8% by weight, based on the weight of the overall composition.

In an exemplary embodiment, the accelerator E is selected from the group of the substituted ureas, for example, 3-(3-chloro-4-methylphenyl)-1,1-dimethylurea (chlorotoluron), or phenyldimethylureas, for example, p-chlorophenyl-N,N-dimethylurea (monuron), 3-phenyl-1,1-dimethylurea (fenuron), 3,4-dichlorophenyl-N,N-dimethylurea (diuron), N,N-dimethylurea, N-isobutyl-N',N'-dimethylurea, 1,1'-(hexane-1,6-diyl)bis(3,3'-dimethylurea).

In general, the accelerator E may have the formula (I)

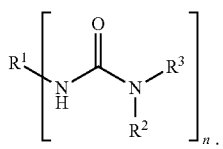

In formula (I), for the accelerator E, $R^1$ is H or an n-valent aliphatic, cycloaliphatic, araliphatic, aromatic or heteroaromatic radical.

In addition, $R^2$ and $R^3$ are each independently an alkyl group or aralkyl group, for example, an alkyl group or aralkyl group having fewer than 19 carbon atoms;

or together are a divalent aliphatic radical which has 3 to 20 carbon atoms and is part of an optionally substituted heterocyclic ring having 5 to 8, for example, 6, ring atoms.

Finally, n is from 1 to 4, for example, 1 or 2.

The expression "each independently" in the definition of groups and radicals means that several groups which occur but have the same designation in the formulae may each have different definitions.

An "araliphatic radical" in this document is understood to mean an aralkyl group, for example, an alkyl group substituted by aryl groups (cf. Römpp, CD Römpp Chemie Lexikon, Version 1, Stuttgart/New York, Georg Thieme Verlag 1995).

If $R^1$ is not H, $R^1$ can be an n-valent aliphatic, cycloaliphatic, araliphatic, aromatic or heteroaromatic radical. In other words, the accelerator E can have, for example, the formula (I')

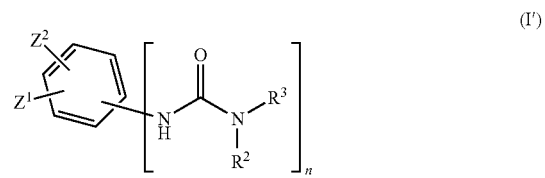

where $Z^1$ and $Z^2$ are each H, a halogen atom or any organic radical, for example an aryl group or an alkyl group having 1 to 8, for example, 1 to 6, carbon atoms.

The accelerator E is, for example, the product of the reaction of an aromatic monomeric diisocyanate with an aliphatic amine compound, for example, of diphenylmethylene 4,4'-diisocyanate with dimethylamine.

Examples of the accelerator E where $R^1$ is an aromatic radical include

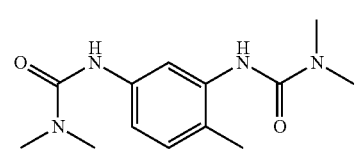

DYHARD® UR 500

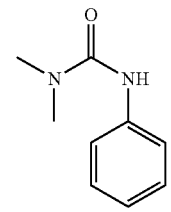

DYHARD® UR 300

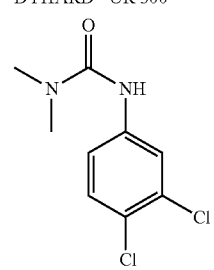

DYHARD® UR 200

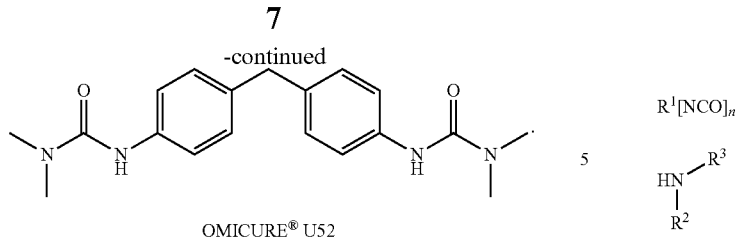

OMICURE® U52

R¹ can also be a radical of an aliphatic, cycloaliphatic, araliphatic, aromatic or heteroaromatic mono-, di-, tri- or tetraisocyanate of the formula (II) after removal of the n isocyanate groups.

$$R^1[NCO]_n \quad (II)$$

This mono-, di-, tri- or tetraisocyanate of the formula (II) is either a monomeric mono-, di-, tri- or tetraisocyanate or a dimer or oligomer of one or more monomeric di- or triisocyanates, dimers or oligomers being, for example, biurets, isocyanurates and uretdiones.

Suitable monomeric monoisocyanates are alkyl isocyanates, for example butyl isocyanate, pentyl isocyanate, hexyl isocyanate, octyl isocyanate, decyl isocyanate and dodecyl isocyanate, and also cyclohexyl isocyanate, methylcyclohexyl isocyanate and benzyl isocyanate.

Suitable monomeric diisocyanates can include, for example, butane 1,4-diisocyanate, hexamethylene diisocyanate (HDI), isophorone diisocyanate (IPDI), trimethylhexamethylene diisocyanate (TMDI), 2,5- or 2,6-bis(isocyanatomethyl)bicyclo[2.2.1]heptane, dicyclohexylmethyl diisocyanate (H12MDI), m-tetramethylxylylene diisocyanate (TMXDI) and m-xylylene diisocyanate (XDI) and hydrogenated m-xylylene diisocyanate (H₈XDI).

Suitable dimers or oligomers can include, for example, HDI biuret, HDI isocyanurate, IPDI biuret, IPDI isocyanurate, HDI diuretdione, IPDI isocyanurate.

Such dimers or oligomers are commercially available, for example, in the form of Desmodur N-100 (Bayer), Luxate HDB 9000 (Lyondell), Desmodur N-3300 (Bayer), Desmodur N-3600 (Bayer), Luxate HT 2000 (Lyondell), Desmodur N-3400 (Bayer), Luxate HD 100 (Lyondell), Desmodur Z 4470 (Bayer), Vestanat T 1890/100 (Huls) or Luxate IT 1070 (Lyondell).

It will be appreciated that it is also possible to use suitable mixtures of the di- or triisocyanates mentioned.

R² and R³ together can form a butylene, pentamethylene or hexamethylene group, for example, a pentamethylene group.

For example, R² and R³ can each independently be an alkyl group having 1 to 5 carbon atoms, for example, each independently a methyl, ethyl or propyl group, for example, each a methyl group.

R¹ in an exemplary embodiment is H. This can be the case, for example, where R² and R³ are each independently a methyl, ethyl or propyl group, for example, each a methyl group.

The accelerators E of the formula (I) are readily obtainable synthetically from the reaction of an aliphatic, cycloaliphatic, araliphatic, aromatic or heteroaromatic mono-, di-, tri- or tetraisocyanate of the formula (II) with a secondary amine of the formula (III).

$$R^1[NCO]_n \quad (II)$$

$$HN\begin{matrix}R^3\\|\\R^2\end{matrix} \quad (III)$$

In a second variant of the synthesis, the accelerator E of the formula (I) is prepared from the reaction of a primary aliphatic, cycloaliphatic, araliphatic, aromatic or heteroaromatic amine of the formula (IV) and a compound of the formula (V).

$$R^1[NH_2]_n \quad (IV)$$

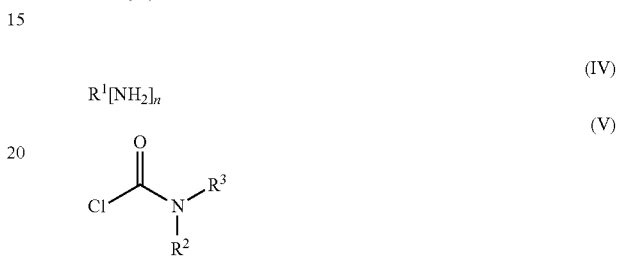

The latter variant can be beneficial, for example, when polyisocyanates of the formula (II) have limited commercial availability, if any.

The accelerator E can have a molecular weight of less than 1000 g/mol, for example, between 80 and 800 g/mol. If the molecular weight is greater, the accelerating action is reduced and the use amount needed is significantly higher, which can in turn lead to poorer mechanical properties.

The amount of the accelerator E can be 0.3-5.0% by weight, for example, 1.0-3.0% by weight, of the total weight of the composition.

For example, the proportion of the accelerator E can be selected such that the onset temperature of the reaction between solid epoxy resin A1, any liquid epoxy resin A2 and hardener B, measured by DSC, is lowered by 35 to 60° C. For example, the onset temperature of the reaction after addition of a suitable amount of the accelerator E is 35 to 60° C. lower than the onset temperature of the mixture without addition of the accelerator E. For the determination of the onset temperature, for the present document, the particular sample is analysed in a DSC system with a heating rate of 10 K/min. The onset temperature is determined here in each case from the point of intersection of the tangent to the base line and the tangent to the rise of the reaction peak.

This can ensure that the reaction of these constituents proceeds rapidly enough, as a result of which a sufficiently high viscosity of the mixture is ensured before the reaction of the hydroxyalkylamide or hydroxyalkylurea H with the carboxylic acid C releases water as a blowing agent. This can prevent the outward diffusion of the blowing agent to any greater extent.

In an exemplary embodiment, the carboxylic acid C is selected from a di- or tricarboxylic acid, or an amorphous, at least difunctional polymer, for example polyester, with carboxyl end groups and a molecular weight between about 1600 g/mol and about 5000 g/mol. Such amorphous polyesters are prepared, for example, by first condensing benzenedicarboxylic acid and aliphatic dicarboxylic acids such as adipic acid or sebacic acid with diols such as butanediol or ethylene glycol to give a difunctional polyester with hydroxyl end groups, and then reacting them with phthalic anhydride or trimellitic anhydride to give what is called an acidic polyester. They are commercially available, for example in the form of Crylcoat® 1540 from Cytec (Tg 58° C., acid number 71, corresponds to a molecular weight of 1600 daltons) or Crylcoat® 1660 (Tg 50° C., acid number 48, corresponds to a molecular weight of 2330 daltons) or Uralac® P 2200 from DSM (Tg 50° C., acid number 51, corresponds to a molecular weight of 2200 daltons).

Examples of the dicarboxylic acid include succinic acid, adipic acid, sebacic acid, glutaric acid and benzenedicarboxylic acid.

The heat-curable epoxy resin composition can comprise at least one hydroxyalkylamide or hydroxyalkylurea H. A hydroxyalkylamide comprises the chemical moiety of the formula (VI). A hydroxyalkylurea comprises the chemical moiety of the formula (VII).

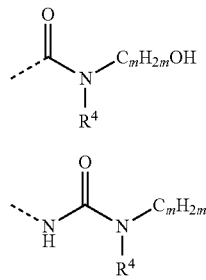

(VI)

(VII)

In these formulae, m is a value of 2 to 6, for example, 2, and $R^4$ is H or an alkyl group having 1 to 5 carbon atoms or a hydroxyalkyl group of the formula $C_mH_{2m}OH$.

Due to their similarity, the moieties of the formulae (VI) and (VII) can be similarly usable even though they belong in chemical terms to different classes.

In an exemplary embodiment, the hydroxyalkylamide or hydroxyalkylurea H is a hydroxyalkylamide H of the formula (VIII).

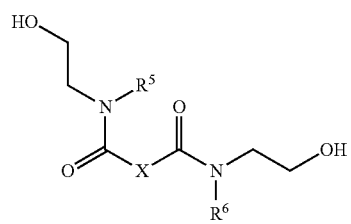

(VIII)

In this formula, X is a phenylene group or —$(CH_2)_n$— where n=1-7 and $R^5$ and $R^6$ are each independently H or an alkyl group having 1 to 5 carbon atoms or —$CH_2CH_2$—OH.

If $R^5$ and $R^6$ are alkyl groups, they each can have 1 to 5 carbon atoms; for example, $R^5$ and $R^6$ in that case are each independently a methyl, ethyl or propyl group, for example, a methyl group.

An example of the hydroxyalkylamide H is N,N,N',N'-tetrakis(2-hydroxyethyl)adipamide, which is available under the Primid® brand from EMS-Chemie. In the above formula (VIII), $R^5$ and $R^6$ are each —$CH_2CH_2$—OH and X is a butylene group.

In an exemplary embodiment, the hydroxyalkylamide or hydroxyalkylurea H is a hydroxyalkylurea H of the formula (IX).

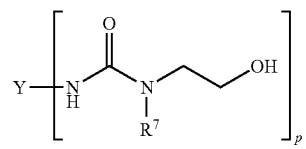

(IX)

In this formula, p is 2 or 3 and Y is an n-valent radical having 4 to 12 carbon atoms and $R^7$ is H or an alkyl group having 1 to 5 carbon atoms or —$CH_2CH_2$—OH.

Y can be an $R^1$ radical as already defined for the accelerator E of the formula (I). Y can be the radical of an isophorone diisocyanate after removal of the two NCO groups.

Such hydroxyalkylureas H can be obtained from isocyanates and amines. This is illustrated as follows using an exemplary embodiment of a hydroxyalkylurea H:

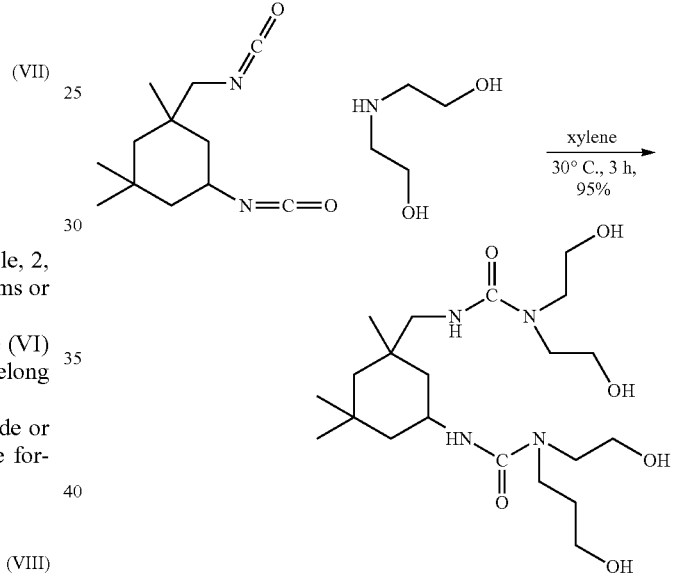

The hydroxyalkylamide or hydroxyalkylurea H can be a hydroxyalkylamide.

It is assumed that hydroxyalkylamide or hydroxyalkylurea H and carboxylic acid C form, with the epoxy resin, an interpenetrating network which may be bonded to the epoxy resin matrix partly via carboxyl groups. The concentration of the polymer, for example polyester, with carboxyl end groups or of the carboxylic acid therefore always has to be below the concentration of the epoxide component in order not to lower the glass transition temperature of the composition too greatly.

As already detailed above, the proportion of the accelerator E can be selected such that the onset temperature of the reaction between solid epoxy resin A1, liquid epoxy resin A2 and hardener B, measured by DSC, is significantly lowered. This can ensure that the reaction of these constituents proceeds rapidly enough and, as a result, a sufficiently high viscosity of the mixture can be ensured.

In order to ensure this with certainty, the proportion of the accelerator E can be selected such that the onset temperature of the reaction of hydroxyalkylamide or hydroxyalkylurea H with carboxylic acid C, measured by DSC, is, for example, at least 20° C. higher than the onset temperature of the reaction between solid epoxy resin A1, liquid epoxy resin A2, and hardener B.

The compositions can be melted and formed in a simple manner at elevated temperature, but below the activation temperature of the hardener. Due to the peculiarity that the heat-curable epoxy resin compositions are typically solid at room temperature and possess a tack-free surface, they are highly suitable for the production of reinforcing elements. Such reinforcing elements are dimensionally stable at room temperature and can be stored in a simple manner.

In an exemplary embodiment, the composition can additionally comprise at least one filler F. The filler can be carbon black, mica, talc, kaolin, wollastonite, feldspar, syenite, chlorite, bentonite, montmorillonite, calcium carbonate (precipitated or ground), dolomite, quartz, silicas (fumed or precipitated), cristobalite, calcium oxide, aluminium hydroxide, magnesium oxide, hollow ceramic spheres, hollow glass spheres, organic hollow spheres, glass spheres, colour pigments. Fillers F can include both the organically coated and the uncoated commercially available forms known to the person skilled in the art.

For example, the total proportion of the overall filler F is 2-50% by weight, for example, 3-35% by weight, for example, 5-25% by weight, based on the weight of the overall composition.

In an exemplary embodiment, for example if higher expansions are desired, the composition may additionally comprise a chemical blowing agent T, as obtainable, for example, under the Expancel® trade name from Akzo Nobel or Celogen® trade name from Chemtura or Luvopor® trade name from Lehmann & Voss, Germany. The proportion of the blowing agent T can be 0.1-1.0% by weight, based on the weight of the composition.

For example, the exemplary composition comprises solely water as a blowing agent and no further chemical blowing agents.

The composition may comprise further constituents, for example, catalysts, heat and/or light stabilizers, thixotropic agents, plasticizers, solvents, mineral or organic fillers, blowing agents, dyes and pigments.

It has been found that the heat-curable epoxy resin compositions described can be suitable as one-component solid adhesives. Such a one-component adhesive has a wide variety of possible uses. For example, it is thus possible to realize heat-curable one-component adhesives which can also additionally be impact-modified with conventional impact modifiers such as core-shell particles. Such core-shell particles are obtainable, for example, under the Paraloid® name from Rohm and Haas or as MX120® from Kaneka.

Such adhesives can be used for the bonding of heat-stable materials. Heat-stable materials are understood to mean materials which are dimensionally stable at least during the hardening time at a hardening temperature of 100-220° C., for example, 120-200° C. These can include metals and polymers such as ABS, polyamide, polyphenylene ether, composite materials such as SMC, unsaturated polyesters GRP, epoxide or acrylate composite materials. For example, heat-stable plastics can include additionally polysulphones or polyether sulphones.

In an exemplary embodiment, at least one material is a metal. For example, the metal is a metal which has been coated by cathodic electrocoating.

An exemplary use is the bonding of identical or different metals, for example, in bodyshell construction in the automobile industry. The exemplary metals are, for example, steel, for example, electrolytically galvanized, hot-dip galvanized and oiled steel, Bonazinc-coated steel, and retrospectively phosphated steel, and also aluminium, for example, in the variants which typically occur in automaking.

Such an adhesive can be first contacted with the materials to be bonded at a temperature of between 10° C. and 80° C., for example, between 10° C. and 60° C., and later cured at a temperature of typically 100-220° C., for example, 120-200° C.

A further aspect of an exemplary aspect therefore relates to a process for bonding heat-stable substrates, comprising the steps of i) applying a heat-curable epoxy resin composition as described above in detail to the surface of a heat-stable substrate S1, for example, of a metal;

ii) contacting the heat-curable epoxy resin composition applied with the surface of a further heat-stable substrate S2, for example, of a metal;

iii) heating the heat-curable epoxy resin composition to a temperature of 100-220° C., for example, 120-200° C., for example, between 160 and 190° C.;

said substrate S2 consisting of the same material as the substrate S1, or a different material.

The heat-stable substrates S1 and S2 can be the heat-stable materials already mentioned above.

Such a process for bonding of heat-stable materials can result in a bonded article. Such an article can be a motor vehicle or an installable component of a motor vehicle.

An exemplary composition, in addition to heat-curable adhesives, can also be used to realise sealing components or coatings. In addition, exemplary compositions can be suitable not only for automobile construction but also for other fields of use. For example, mention can be made of related applications in the construction of modes of transport such as ships, trucks, buses or rail vehicles, or in the construction of consumer goods, for example, washing machines.

The materials bonded by means of an exemplary composition can be used at temperatures between typically 120° C. and −40° C., for example, between 100° C. and −40° C., for example, between 80° C. and −40° C.

An exemplary use of an exemplary heat-curable epoxy resin composition is the use thereof as a heat-curable bodyshell adhesive in motor vehicle construction.

A further exemplary use of an exemplary heat-curable epoxy resin composition is the use thereof for bonding or reinforcing metal structures or reinforcing filling of cavities in motor vehicle construction or sandwich panel construction.

The heat-curable epoxy resin composition can be applied to a support. Such supports can be made of a heat-stable material as already mentioned above as heat-stable substrates S1. The heat-curable epoxy resin composition can be applied here to the support in the molten state.

It is thus possible in a simple manner to realise reinforcing elements for the reinforcement of metallic structures, comprising a support to which a heat-curable epoxy resin composition described has been applied.

These reinforcing elements can be fixed on the metallic structure to be reinforced or fixed into a cavity of the metallic structure to be reinforced. The fixing can be effected here by a fixing means such as a clip, a screw, a hook, a rivet, a groove or an adhesive, or else it can be effected by a suitable geometry of the structure which enables clamped insertion. The support can have such a fixing means. For example, when the structure to be reinforced can have a counterpart corresponding to the fixing means, for example a protruding edge/hook or bolt/screw thread.

A further exemplary aspect relates to a cured epoxy resin composition which is obtained by the heating of a heat-curable epoxy resin composition described in detail above to a temperature of 100-220° C., for example, 120-200° C.

A further exemplary aspect relates to a structural foam which is obtained by heating from a heat-curable epoxy resin composition already described.

A structural foam has the properties, for example, that it firstly foams when heated and secondly is capable, through the chemical curing of the composition, of transmitting great forces and hence of reinforcing a structure, typically a metallic structure. Such structural foams can be used in cavities of metallic structures. For example, they can also be used as a constituent in the above-described reinforcing elements.

For example, they can be employed in the cavities of support columns of a body of a mode of transport. The support can keep this reinforcing element in the desired place. The reinforcing element is typically introduced in the course of bodyshell construction, for example, in the construction of the body. After passing through a cathodic electrocoating bath, the body enters a cathodic electrocoating furnace where the cathodic electrocoat is baked at a temperature of typically 160 to 190° C. The water vapor formed at these temperatures leads, as a blowing agent, to the formation of a foam, in the course of which the heat-curable composition reacts chemically with crosslinking, which leads to the curing of the adhesive.

These reinforcing elements can therefore be used in places where, after assembly, due to the shape and/or small dimensions of such cavities, it is in many cases difficult to efficiently reinforce or seal them, or prevent noise transmission.

Due to these structural foams, it is possible in spite of relatively low weight to obtain high strengths and dense structures. In addition, it is possible by virtue of the filling and sealing function of the structural foam also to isolate the interior of cavities and thus to reduce driving noise and vibration markedly.

For example, an exemplary aspect provides structural foams with excellent properties, which are obtained by using a nontoxic and nonflammable blowing agent in the form of water.

EXAMPLES

Preparation of Examples 1-8

TABLE 1

Raw materials used

| Manufacturer | Designation | Molecular weight (g/mol) | Functionality |
|---|---|---|---|
| Huntsman | Araldite ® GT 7004, solid epoxy resin based on bisphenol A | 1470 | 2 |
| Cytec | Crylcoat ® 1680, amorphous polyester with carboxylic acid end groups | 2334 | 2 |
| Cytec | Crylcoat ® 1560-0, amorphous polyester with carboxylic acid end groups | 1600 | 2 |

TABLE 1-continued

Raw materials used

| Manufacturer | Designation | Molecular weight (g/mol) | Functionality |
|---|---|---|---|
| EMS-Chemie | Primid ® XL 552, hydroxyalkylamide | 320 | 4 |
| Degussa | dicyandiamide | 84 | 6 |
| Degussa | Aerosil ® R202, fumed silica | | |
| Lanxess | GF 3 mm, 3 mm glass fibres | | |
| Omya | Omyacarb ®, precipitated chalk (calcium carbonate) | | |
| Degussa | Dyhard ® UR500 (dimethylurea derivative) | | |

The components were, according to the compositions specified in Table 2, first premixed in a mixer and then extruded in a twin-screw extruder (L/D 24) at 95° C. Examples 1 and 2 are comparative examples; examples 3-8 represent tests with the exemplary compositions.

The solid extrudate was pressed to give sheets of thickness 2 mm. Specimens were produced from these sheets and characterized. The results are shown in Table 2.

Test Methods:

Glass Transition Temperature ($T_g$)

The glass transition temperature was determined by means of DSC. For this purpose a Mettler DSC822e instrument was used. 10-20 mg of the compositions were in each case weighed into an aluminium crucible. Once the sample had been cured in the DSC at 175° C. over the course of 30 min, the sample was cooled to 0° C. and then heated to 180° C. at a heating rate of 10° C./min. The glass transition temperature was determined with the aid of the DSC software from the DSC curve measured.

Modulus of Elasticity (DIN EN ISO 527)

A sample was pressed to a layer thickness of 2 mm between two Teflon papers. Subsequently, the sample was cured at 180° C. over the course of 30 minutes. The Teflon papers were removed and the test specimens according to the DIN standard were stamped out in the hot state. The test specimens were tested at a pulling speed of 2 mm/min after one day of storage under standard climatic conditions (23° C./50% relative air humidity). The tensile strength and the modulus of elasticity were determined to DIN EN ISO 527. In the case of the modulus of elasticity, the determination was made from 0.05 to 0.25% elongation and it was reported in Table 2 as modulus of elasticity$_{0.05-0.25\%}$ ($ME_{0.05-0.25\%}$).

Tensile Shear Strength (TSS) (DIN EN 1465)

The test specimens were produced from the example compositions described and with electrolytically galvanized DC04 steel (eloZn) with dimensions 100×25×1.5 mm; the adhesive surface was 25×10 mm with a layer thickness of 2 mm. Curing was effected at 180° C. for 30 min. The pulling speed was 10 mm/min.

The results of these tests are compiled in Table 2. Modulus of elasticity, tensile shear strength and glass transition temperature were determined on samples which were foamed at 180° C. for 30 minutes.

Expansion

The expansion (Exp) was determined from the difference between the density of the unfoamed material ($d_o$) and the density of the foamed material ($d_1$), by the formula:

$$Exp = (d_0 - d_1)/d_1$$

The foaming was effected at a temperature of 160° C. or 180° C.

TABLE 2

Compositions and results.

|  | 1 | 2 | 3 | 4 | 5 | 6 | 7 | 8 |
|---|---|---|---|---|---|---|---|---|
| Araldite ® GT7004 [PW[1]] | 62.55 | 46.64 | 46.64 | 46.63 | 46.64 | 46.65 | 46.64 | 46.64 |
| Crylcoat ® 1506-0 [PW[1]] | — | 30.32 | 30.32 | 30.32 | 30.32 | 30.32 | 30.31 | 30.31 |
| Crylcoat ® 1680 [PW[1]] | 15.64 | — | — | — | — | — | — | — |
| Primid ® XL 552 [PW[1]] | 1.07 | 3.03 | 3.03 | 3.04 | 3.03 | 3.04 | 3.03 | 3.04 |
| Dicyandiamide [PW[1]] | 1.19 | 0.89 | 0.88 | 0.89 | 0.89 | 0.89 | 0.89 | 0.89 |
| Aerosil ® R202 [PW[1]] | 3.91 | 3.26 | 3.27 | 3.26 | 3.26 | 3.26 | 3.27 | 3.26 |
| GF 3 mm [PW[1]] | 7.82 | 7.93 | 7.93 | 7.93 | 7.93 | 7.93 | 7.93 | 7.93 |
| Calcium carbonate (Omyacarb ®) [PW[1]] | 7.82 | 7.93 | 7.93 | 7.93 | 7.93 | 7.93 | 7.93 | 7.93 |
| Dyhard ® UR500 [PW1] | — | — | 0.46 | 0.92 | 1.38 | 1.83 | 2.06 | 2.28 |
| Total | 100.00 | 100.00 | 100.46 | 100.92 | 101.38 | 101.83 | 102.06 | 102.28 |
| Exp (160° C.) [%] | 35 | 35 | 50 | 58 | 62 | 70 | 78 | 85 |
| Exp (180° C.) [%] | 35 | 35 | 55 | 62 | 75 | 82 | 98 | 110 |
| $ME_{0.05-0.25\%}$ [MPa] | 1520 | 1200 | 1050 | 980 | 820 | 780 | 615 | n.d.[2] |
| TSS [MPa] | 3.6 | 4.1 | 3.3 | 2.8 | 2.4 | 1.9 | 1.2 | 1.2 |
| Glass transition temperature [° C.] | 84 | 84 | 85 | 86 | 86 | 86 | 85.5 | 84.5 |

PW[1] = parts by weight,
n.d.[2] = not determined

These examples show that only moderate expansions are obtained without addition of an accelerator. The theoretical expansion with 15.5% Crylcoat® 1680 would be about 300% based on the water of reaction formed. This value can be derived as follows:

15.5 g of Crylcoat® 1680 correspond to 0.0133 mol of carboxyl groups per 100 g of formulation. Since 1 mol of water is formed per carboxyl group in the reaction with hydroxyalkylamide, the 0.0133 mol of water vapour formed, assuming the molar gas volume of 22.4 l/mol, corresponds to a gas volume of about 297.5 ml. Proceeding from a density of the unfoamed formulation of about 100 g/100 ml, the theoretical density after complete foaming is calculated to be 100 g/(100 ml+297.5 ml). Thus, using the above formula, an expansion of 297% can be calculated.

In comparative examples 1 and 2, no accelerator based on a urea derivative is added in an otherwise similar composition. The expansion values at 35% are obviously much inferior to the values which are achieved with addition of the accelerator in examples 3 to 8 (expansion up to 110%).

As already detailed above, with increasing concentration of the accelerator, epoxide crosslinking and hence expansion increase. This is because, by virtue of the low viscosity of the epoxy resin matrix, the water vapour produced by the condensation reaction can then no longer diffuse out to a relevant degree and in that respect contributes fully to the expansion of the foam.

Surprisingly, it was additionally found that the exemplary heat-curable epoxy resin composition leads, under the customary temperature conditions used for the heat curing, to the formation of a foam with high mechanical strength, good glass strength and good adhesion capacity on metallic and nonmetallic substrates, and it is possible at the same time to entirely dispense with the use of the known toxic or inflammable blowing agents.

The results in Table 2 demonstrate this clearly. The values achieved for the modulus of elasticity, the tensile shear strength and the glass transition temperature decrease with increasing expansion of the compositions (Examples 3 to 8), but this is attributable solely to the expansion itself and the resultant change in properties of the foam. However, the values achieved are entirely comparable to those for conventional foams which use toxic or inflammable blowing agents.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A heat-curable epoxy resin composition, comprising:
   (a) at least one solid epoxy resin A1 having an average of more than one epoxide group per molecule;
   (b) at least one hardener B for epoxy resins which is activated by elevated temperature;
   (c) at least one carboxylic acid C;
   (d) at least one hydroxyalkylamide or hydroxyalkylurea H; and
   (e) optionally at least one liquid epoxy resin A2 with an average of more than one epoxide group per molecule,
   wherein the heat-curable epoxy resin composition further comprises at least one accelerator E based on a urea derivative for activating a reaction of components A1, and optionally A2, with B, and
   wherein a proportion of the accelerator E is selected such that an onset temperature of a reaction of the hydroxyalkylamide or hydroxyalkylurea H with the carboxylic acid C, measured by DSC, is at least 20° C. higher than an onset temperature of the reaction between the solid epoxy resin A1, optionally liquid epoxy resin A2 and hardener B.

2. The heat-curable epoxy resin composition according to claim 1, wherein the liquid epoxy resin A2 is selected from the group consisting of diglycidyl ethers of bisphenol A, diglycidyl ethers of bisphenol F, and diglycidyl ethers of bisphenol A/F.

3. The heat-curable epoxy resin composition according to claim 1, wherein the carboxylic acid C is selected from the group consisting of a di- or tricarboxylic acid, and an amorphous, at least difunctional polymer with carboxyl end groups and a molecular weight between about 1600 g/mol and about 5000 g/mol.

4. The heat-curable epoxy resin composition according to claim 3, wherein the dicarboxylic acid is selected from the group consisting of succinic acid, adipic acid, sebacic acid, glutaric acid and benzenedicarboxylic acid.

5. The heat-curable epoxy resin composition according to claim 1, wherein the hardener B is a latent hardener selected from the group consisting of dicyandiamide, guanimine, guanidine, aminoguanidine and derivatives thereof, and aromatic or aliphatic carboxylic hydrazides.

6. The heat-curable epoxy resin composition according to claim 1, wherein the accelerator E is selected from the group consisting of a substituted urea, a phenyldimethylurea, N,N-dimethylurea, N-isobutyl-N',N'-dimethylurea, 1,1'-(hexane-1,6-diyl)bis(3,3'-dimethylurea), and a product of a reaction of an aromatic monomeric diisocyanate, with an aliphatic amine compound.

7. The heat-curable epoxy resin composition according to claim 1, wherein the proportion of the accelerator E is selected such that an onset temperature of a reaction between solid epoxy resin A1, liquid epoxy resin A2 and hardener B, measured by DSC, is lowered by 35-60° C.

8. The heat-curable epoxy resin composition according to claim 7, wherein the proportion of the accelerator E is 0.3-5.0% by weight, of a total weight of the composition.

9. The heat-curable epoxy resin composition according to claim 1, wherein the hydroxyalkylamide or hydroxyalkylurea H is a hydroxyalkylamide of the formula (VIII)

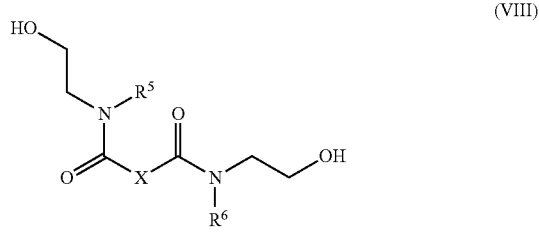

(VIII)

wherein X is a phenylene group or —$(CH_2)_n$—, n=1-7, and $R^5$ and $R^6$ are each independently H or an alkyl group having 1 to 5 carbon atoms or —$CH_2CH_2$—OH.

10. The heat-curable epoxy resin composition according to claim 1, wherein a reaction between the hydroxyalkyl-amide or hydroxyalkylurea H and the carboxylic acid C releases water which serves as a blowing agent in a foaming process.

11. A reinforcing element for the reinforcement of metallic structures, comprising a support to which the heat-curable epoxy resin composition according to claim 1 has been applied.

12. A process for bonding heat-stable substrates, comprising:
i) applying a heat-curable epoxy resin composition according to claim 1 to a surface of a heat-stable substrate S1;
ii) contacting the applied heat-curable epoxy resin composition with a surface of a further heat-stable substrate S2;
iii) heating the heat-curable epoxy resin composition to a temperature of 100-220° C.;
wherein said substrate S2 is of a same or different material as the substrate S1.

13. The heat-curable epoxy resin composition according to claim 1, wherein the composition is suitable for use for bonding or reinforcing metal structures or reinforcing filling of cavities in motor vehicle construction or sandwich panel construction.

14. A structural foam obtained by heating the heat-curable epoxy resin composition according to claim 1.

15. The heat-curable epoxy resin composition according to claim 1, wherein the accelerator E is 3-(3-chloro-4-methylphenyl)-1,1-dimethylurea (chlorotoluron), p-chlorophenyl-N,N-dimethylurea (monuron), 3-phenyl-1,1-dimethylurea (fenuron), 3,4-dichlorophenyl-N,N-dimethylurea (diuron), or a product of a reaction of diphenylmethylene 4,4'-diisocyanate with dimethylamine.

16. The heat-curable epoxy resin composition according to claim 1, wherein the proportion of the accelerator E is 1.0-3.0% by weight, of a total weight of the composition.

17. The process for bonding heat-stable substrates according to claim 12, wherein the surface of the heat-stable substrate S1, is a metal surface, and the surface of the further heat-stable substrate S2 is a metal surface.

18. The process for bonding heat-stable substrates according to claim 12, wherein the heat-curable epoxy resin composition is heated to a temperature of 120-200° C.

19. The process for bonding heat-stable substrates according to claim 12, wherein the heat-curable epoxy resin composition is heated to a temperature of between 160 and 190° C.

20. The heat-curable epoxy resin composition according to claim 1, wherein the heat-curable epoxy resin composition is free of a toxic or inflammable blowing agent.

* * * * *